United States Patent
Fang et al.

(10) Patent No.: US 9,473,937 B2
(45) Date of Patent: Oct. 18, 2016

(54) METHOD, SYSTEM AND RECEIVING TERMINAL FOR PROCESSING INFORMATION BASED ON DUAL-TONE MULTI-FREQUENCY

(71) Applicant: ZTE CORPORATION, Shenzhen (CN)

(72) Inventors: Wen Fang, Shenzhen (CN); Lijun Tian, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 0 days.

(21) Appl. No.: 14/421,877

(22) PCT Filed: Jun. 9, 2013

(86) PCT No.: PCT/CN2013/077111
§ 371 (c)(1),
(2) Date: Mar. 25, 2015

(87) PCT Pub. No.: WO2014/029228
PCT Pub. Date: Feb. 27, 2014

(65) Prior Publication Data
US 2015/0281956 A1    Oct. 1, 2015

(30) Foreign Application Priority Data
Aug. 23, 2012 (CN) .......................... 2012 1 0303102

(51) Int. Cl.
| | |
|---|---|
| *H04M 1/66* | (2006.01) |
| *H04W 12/06* | (2009.01) |
| *H04M 1/725* | (2006.01) |
| *H04W 12/04* | (2009.01) |
| *H04M 11/06* | (2006.01) |

(52) U.S. Cl.
CPC ......... *H04W 12/06* (2013.01); *H04M 1/72519* (2013.01); *H04M 11/066* (2013.01); *H04W 12/04* (2013.01); *H04M 2203/654* (2013.01)

(58) Field of Classification Search
CPC ....................... H04M 1/7258; H04M 1/72583
See application file for complete search history.

(56) References Cited

U.S. PATENT DOCUMENTS

| | | | |
|---|---|---|---|
| 5,960,069 A * | 9/1999 | Felger | G06Q 20/12 379/114.01 |
| 2006/0023852 A1* | 2/2006 | Casey | H04M 11/064 379/93.18 |
| 2006/0270388 A1* | 11/2006 | Veeramachaneni | H04M 3/42382 455/412.1 |

(Continued)

FOREIGN PATENT DOCUMENTS

| | | |
|---|---|---|
| CN | 101159794 | 4/2008 |
| CN | 101351004 | 1/2009 |

(Continued)

*Primary Examiner* — Shantell L Heiber
(74) *Attorney, Agent, or Firm* — Pearl Cohen Zedek Latzer Baratz LLP

(57) ABSTRACT

A method and system for processing information based on dual-tone multifrequency, and a receiving terminal are disclosed in the present document. The method includes: a sending terminal establishing a voice call with a receiving terminal; the sending terminal receiving input key information, encoding the key information into dual-tone multifrequency information, and transmitting the dual-tone multifrequency information and voice call audio information to the receiving terminal together; and the receiving terminal decoding and restoring the dual-tone multifrequency information to the key information; determining a type of the key information according to a preset key information judgment policy, and performing corresponding operations according to the key information.

17 Claims, 5 Drawing Sheets

(56) References Cited

U.S. PATENT DOCUMENTS

2007/0025331 A1* 2/2007 Laurent ............... G06Q 20/108 370/352
2013/0086633 A1* 4/2013 Schultz .................... H04L 9/00 726/2

FOREIGN PATENT DOCUMENTS

| CN | 102308566 | 1/2012 |
| CN | 102833411 | 12/2012 |
| DE | 10 2007 046 978 | 7/2010 |
| JP | 2003134192 | 7/2003 |

* cited by examiner

METHOD, SYSTEM AND RECEIVING TERMINAL FOR PROCESSING INFORMATION BASED ON DUAL-TONE MULTI-FREQUENCY

CROSS-REFERENCE TO RELATED APPLICATIONS

This application is a National Phase Application of PCT International Application No. PCT/CN2013/077111, entitled "METHOD, SYSTEM AND RECEIVING TERMINAL FOR PROCESSING INFORMATION BASED ON DUAL-TONE MULTI-FREQUENCY", International Filing Date Jun. 9, 2013, published on Feb. 27, 2014 as International Publication No. WO/2014/029228, which in turn claims priority from Chinese patent Application No. 201210303102.1, filed Aug. 23, 2012, all of which are incorporated herein by reference in their entirety.

TECHNICAL FIELD

The present document relates to the field of communication technology, and particularly, to a method and system for processing information based on Dual-Tone MultiFrequency (DTMF), and a receiving terminal.

BACKGROUND

The dual-tone multifrequency is a main method for transmitting numbers through tones in a voice channel in a voice call, and it is invented by Bell Laboratories. The dual-tone multifrequency represents one number through overlap of two frequency signals in a time domain. That is, the number is represented by overlapping a signal with higher frequency and a signal with lower frequency, and such characteristic enables the numerical information sent through the dual-tone multifrequency to be mixed in voices and be differentiated and identified by a decoder.

Since numbers and character information such as * and # can be transferred in the voice call with the dual-tone multifrequency technology, the technology is widely applied to services and selection information transmission in the voice call. For example, after a subscriber dials customer service numbers of organizations such as operators and banks and so on, numbers 1, 2, 3 and 4, etc. input by the subscriber later are sent through the dual-tone multifrequency. At this point, a voice receiving server side of the operators and banks has a dual-tone multifrequency decoder, the decoder can identify the numbers 1, 2, 3 and 4, etc. input by the subscriber after converting the transmitted voices to the frequency domain, and perform a corresponding operation according to the identified number, such as operations of selecting type of service, entering card number or entering password and so on.

Even though the dual-tone multifrequency function gives an effective information transmission approach between mobile subscribers and service providers, few common subscribers perform information transmission with the function in the call. Therefore, a majority of mobile phones only integrate a dual-tone multifrequency coder in a voce call function at present, but does not integrate a dual-tone multifrequency decoder.

However, the mobile subscribers usually encounter a following difficulty in the process of actually using the mobile phones: in a call process between A and B, A tells B a telephone number, B does not have paper and pencil on hands at the moment and cannot record the number; or though B has the paper and pencil and records the telephone number, due to problems such as voice call environment noise and so on, it causes that the recorded number is inconsistent with the number told by A. Thus a trouble is brought to the two parties of the call.

SUMMARY

The main object of the present document is to provide a method and system for processing information based on dual-tone multifrequency, and a receiving terminal, so that a terminal subscriber transmits numeric number information in a voice call process.

The embodiment of the present document discloses a method for processing information based on dual-tone multifrequency, which comprises:

a sending terminal establishing a voice call with a receiving terminal;

the sending terminal receiving input key information, encoding the key information into dual-tone multifrequency information, and transmitting the dual-tone multifrequency information and voice call audio information to the receiving terminal together; and the receiving terminal decoding and restoring the dual-tone multifrequency information to the key information; determining a type of the key information according to a preset key information judgment policy, and performing corresponding operations according to the key information.

Preferably, the key information comprises numeric numbers and non-numeric numbers;

when the key information is numeric numbers, performing corresponding operations according to the key information is specifically: generating corresponding operation menus according to characteristics of the numeric numbers, and performing corresponding operations on the operation menus according to a received menu operation instruction.

Preferably, the key information judgment policy comprises:

when the key information is an 11-digit numeric number, and the first three digits of the numeric number have a mobile phone number characteristic, judging that the numeric number is a mobile phone number;

when the key information is an 11-digit numeric number, and the first three digits or the first four digits of the numeric number have a fixed-line telephone number characteristic, judging that the numeric number is a fixed-line telephone number;

when the key information is an 18-digit numeric number, and the first six digits of the numeric number have an identity card address code characteristic, judging that the numeric number is an identity card number.

Preferably, the numeric numbers comprise: a mobile phone number, a fixed-line telephone number, an identity card number and a bank card number; the operation menus comprise: a mobile phone number operation menu, a fixed-line telephone number operation menu, an identity card number operation menu and a bank card number operation menu.

Preferably, the mobile phone number operation menu comprises: a save-number menu item, a send-message menu item, a dial menu item, and a number attribution inquiry menu item;

the fixed-line telephone number operation menu comprises: a save-number menu item, a dial menu item, and a number attribution inquiry menu item; and the identity card number operation menu comprises: a save-text menu item, an identity card number attribution inquiry menu item, and an identity card holder birthday inquiry menu item.

Preferably, the key information judgment policy further comprises:

when the key information is the first non-numeric number, defining the first non-numeric number as a last-digit numeric number deletion instruction; when the key information is the second non-numeric number, defining the second non-numeric number as next-group numeric numbers input prompt information; and when the key information is the third non-numeric number, defining the third non-numeric number as clearing the last group of numeric numbers.

Preferably, when the key information is non-numeric numbers, the receiving terminal performing corresponding operations according to the key information is specifically:

when the key information is the first non-numeric number, the receiving terminal determining that the key information is the last-digit numeric number deletion instruction, and executing an operation of deleting the last-digit numeric number;

when the key information is the second non-numeric number, the receiving terminal determining that the key information is the next-group numeric numbers input prompt information, and executing an operation of receiving and processing the next group of numeric numbers sent by the sending terminal; and when the key information is the third non-numeric number, the receiving terminal determining that the key information is a last-group numeric numbers deletion instruction, and executing an operation of clearing the last group of numeric numbers;

wherein, the first non-numeric number, the second non-numeric number and the third non-numeric number are different non-numeric numbers respectively.

The embodiment of the present document further discloses a system for processing information based on dual-tone multifrequency, which comprises:

a sending terminal, configured to: receive input key information after establishing a voice call with a receiving terminal, encode the key information into dual-tone multifrequency information, and transmit the dual-tone multifrequency information and voice call audio information to the receiving terminal together; and the receiving terminal, configured to: receive the dual-tone multifrequency information, and decode and restore the dual-tone multifrequency information to the key information; determine a type of the key information according to a preset key information judgment policy, and perform corresponding operations according to the key information.

Preferably, the key information comprises numeric numbers and non-numeric numbers;

the receiving terminal is configured to: when the key information is numeric numbers, generate corresponding operation menus according to characteristics of the numeric numbers, and perform corresponding operations on the operation menus according to a received menu operation instruction.

Preferably, the key information judgment policy comprises:

when the key information is an 11-digit numeric number, and the first three digits of the numeric number have a mobile phone number characteristic, judging that the numeric number is a mobile phone number;

when the key information is an 11-digit numeric number, and the first three digits or the first four digits of the numeric number have a fixed-line telephone number characteristic, judging that the numeric number is a fixed-line telephone number;

when the key information is an 18-digit numeric number, and the first six digits of the numeric number have an identity card address code characteristic, judging that the numeric number is an identity card number.

Preferably, the numeric numbers comprise: a mobile phone number, a fixed-line telephone number, an identity card number and a bank card number; the operation menus comprise: a mobile phone number operation menu, a fixed-line telephone number operation menu, an identity card number operation menu and a bank card number operation menu.

Preferably, the mobile phone number operation menu comprises: a save-number menu item, a send-message menu item, a dial menu item, and a number attribution inquiry menu item;

the fixed-line telephone number operation menu comprises: a save-number menu item, a dial menu item, and a number attribution inquiry menu item; and the identity card number operation menu comprises: a save-text menu item, an identity card number attribution inquiry menu item, and an identity card holder birthday inquiry menu item.

Preferably, the key information judgment policy further comprises:

when the key information is the first non-numeric number, defining the first non-numeric number as a last-digit numeric number deletion instruction; when the key information is the second non-numeric number, defining the second non-numeric number as next-group numeric numbers input prompt information; and when the key information is the third non-numeric number, defining the third non-numeric number as clearing the last group of numeric numbers.

Preferably, the receiving terminal is configured to: when the key information is the first non-numeric number, determine that the key information is the last-digit numeric number deletion instruction, and execute an operation of deleting the last-digit numeric number; when the key information is the second non-numeric number, determine that the key information is the next-group numeric numbers input prompt information, and execute an operation of receiving and processing the next group of numeric numbers sent by the sending terminal; and when the key information is the third non-numeric number, determine that the key information is a last-group numeric numbers deletion instruction, and execute an operation of clearing the last group of numeric numbers;

wherein, the first non-numeric number, the second non-numeric number and the third non-numeric number are different non-numeric numbers respectively.

The embodiment of the present document further discloses a receiving terminal, configured to: receive dual-tone multifrequency information, and decode and restore the dual-tone multifrequency information to key information; determine a type of the key information according to a preset key information judgment policy, and perform corresponding operations according to the key information.

Preferably, the key information includes numeric numbers and non-numeric numbers;

the receiving terminal is configured to: when the key information is numeric numbers, generate corresponding operation menus according to characteristics of the numeric numbers, and perform corresponding operations on the operation menus according to a received menu operation instruction.

Preferably, the numeric numbers comprise: a mobile phone number, a fixed-line telephone number, an identity card number and a bank card number; the operation menus comprise: a mobile phone number operation menu, a fixed-line telephone number operation menu, an identity card number operation menu and a bank card number operation menu.

Preferably, the key information judgment policy comprises:

when the key information is an 11-digit numeric number, and the first three digits of the numeric number have a mobile phone number characteristic, judging that the numeric number is a mobile phone number;

when the key information is an 11-digit numeric number, and the first three digits or the first four digits of the numeric number have a fixed-line telephone number characteristic, judging that the numeric number is a fixed-line telephone number;

when the key information is an 18-digit numeric number, and the first six digits of the numeric number have an identity card address code characteristic, judging that the numeric number is an identity card number.

Preferably, the mobile phone number operation menu comprises: a save-number menu item, a send-message menu item, a dial menu item, and a number attribution inquiry menu item;

the fixed-line telephone number operation menu comprises: a save-number menu item, a dial menu item, and a number attribution inquiry menu item; and the identity card number operation menu comprises: a save-text menu item, an identity card number attribution inquiry menu item, and an identity card holder birthday inquiry menu item.

Preferably, the key information judgment policy further comprises:

when the key information is the first non-numeric number, defining the first non-numeric number as a last-digit numeric number deletion instruction; when the key information is the second non-numeric number, defining the second non-numeric number as next-group numeric numbers input prompt information; and when the key information is the third non-numeric number, defining the third non-numeric number as clearing the last group of numeric numbers.

Preferably, the receiving terminal is configured to: when the key information is the first non-numeric number, determine that the key information is the last-digit numeric number deletion instruction, and execute an operation of deleting the last-digit numeric number; when the key information is the second non-numeric number, determine that the key information is the next-group numeric numbers input prompt information, and execute an operation of receiving and processing the next group of numeric numbers sent by the sending terminal; and when the key information is the third non-numeric number, determine that the key information is a last-group numeric numbers deletion instruction, and execute an operation of clearing the last group of numeric numbers;

wherein, the first non-numeric number, the second non-numeric number and the third non-numeric number are different non-numeric numbers respectively.

With a method and system for processing information based on dual-tone multifrequency, and a receiving terminal provided in the present document, in a process of a sending terminal establishing a voice call with the receiving terminal, the sending terminal encodes the received input key information into dual-tone multifrequency information and then transmits the dual-tone multifrequency information and voice call audio information to the receiving terminal together, and the receiving terminal then decodes and restores the dual-tone multifrequency information to the key information, thus by this means, two parties of the terminals establishing the voice call can mutually transmit the key information, compared to the existing verbal information transmission, it is simple to operate, an accuracy rate is high, and a case of information receiving errors will not occur; and compared to the existing information transmission by means of short messages, it is simple to operate, no short message fee will be produced, and expense costs are lower.

PREFERRED EMBODIMENTS OF THE DOCUMENT

It should be understood that, the specific embodiments described here are only used to explain the present document, which is not used to limit the present document.

Figure 1:
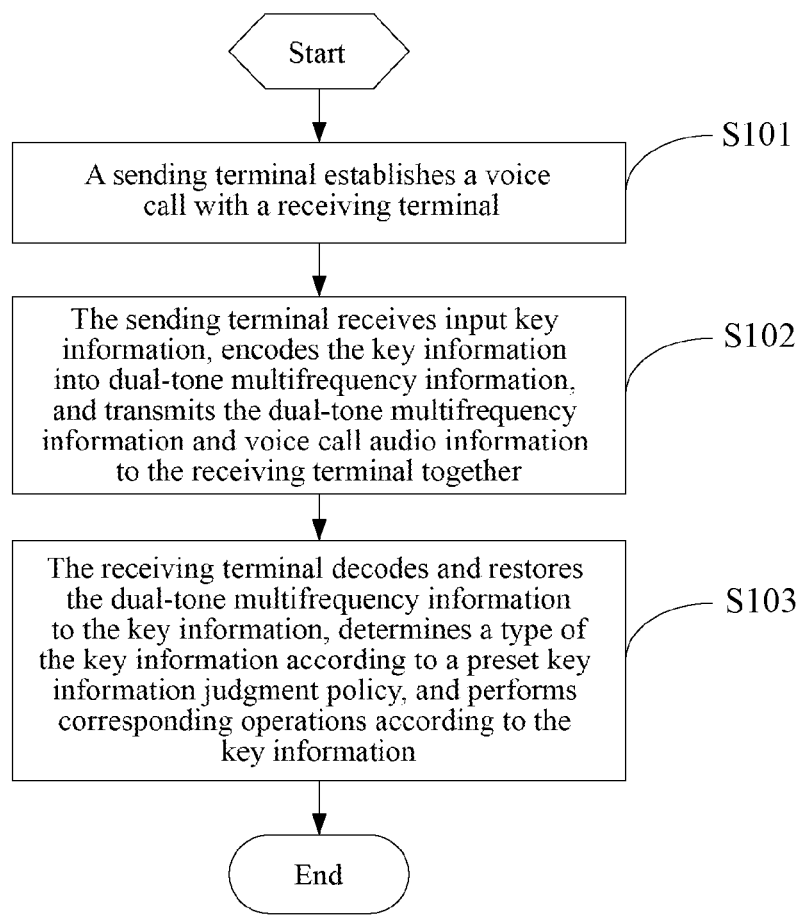
FIG. 1 is a flow chart of a method for processing information based on dual-tone multifrequency according to one embodiment of the present document.

With reference to FIG. 1, a method for processing information based on dual-tone multifrequency according to one embodiment of the present document is disclosed, and the following steps are included.

In step S101, a sending terminal establishes a voice call with a receiving terminal.

In step S102, the sending terminal receives input key information, encodes the key information into dual-tone multifrequency information, and transmits the dual-tone multifrequency information and voice call audio information to the receiving terminal together.

The key information in the step S102 includes numeric numbers and non-numeric numbers, wherein the numeric numbers can include: a mobile phone number, a fixed-line telephone number and an identity card number; the non-numeric numbers can be characters such as #, * and so on, or punctuations, or capital or lowercase English letters. After the sending terminal establishes the voice call with the receiving terminal, when a sending terminal subscriber wishes to transmit numeric number information (e.g. a mobile phone number) to the receiving terminal, the subscriber can input numeric numbers to the sending terminal through keys on a keyboard of the sending terminal, and then the sending terminal encodes each input numeric number into dual-tone multifrequency information that one signal with higher frequency and one signal with lower frequency are overlapped in a time domain according to a preset policy, with reference to Table 1. Then the encoded dual-tone multifrequency information is arranged according to a sequence corresponding to the input numeric numbers, and then the encoded dual-tone multifrequency information and voice call audio information are transmitted to the receiving terminal together.

TABLE 1

| Dual-tone multifrequency | | High group/HZ | | | |
|---|---|---|---|---|---|
| | | 1209 | 1336 | 1477 | 1633 |
| Low group/HZ | 697 | 1 | 2 | 3 | A |
| | 770 | 4 | 5 | 6 | B |
| | 852 | 7 | 8 | 9 | C |
| | 941 | * | 0 | # | D |

In step S103, the receiving terminal decodes and restores the dual-tone multifrequency information to the key information; determines a type of the key information according to a preset key information judgment policy, and performs corresponding operations according to the key information.

Furthermore, in the above embodiment of the method for processing information based on dual-tone multifrequency, the key information comprises numeric numbers and non-numeric numbers. When the key information is numeric numbers, performing corresponding operations according to the key information is specifically: generating corresponding operation menus according to characteristics of the numeric numbers, and performing corresponding operations on the operation menus according to the received menu operation instruction.

In the embodiment, the operation menus include multiple menu items, after generating a corresponding operation menu, the receiving terminal also displays the operation menu through a display module, a receiving terminal subscriber can select to input a menu item operation instruction according to menu items in the operation menu, and the receiving terminal executes a corresponding operation according to the input menu item operation instruction. Wherein the subscriber selecting to input the menu item operation instruction can be implemented by clicking an area in which a certain menu item in the operation menu is located. For example, a certain menu item is a save-number menu item, after the subscriber clicks an area in which the save-number menu item is located, the receiving terminal performs corresponding number save operation.

Furthermore, in the above embodiment of the method for processing information based on dual-tone multifrequency, the numeric numbers can include: a mobile phone number, a fixed-line telephone number, an identity card number and a bank card number; the operation menus can include: a mobile phone number operation menu, a fixed-line telephone number operation menu, an identity card number operation menu and a bank card number operation menu. The key information judgment policy includes: when the key information is an 11-digit numeric number, and the first three digits of the numeric number have a mobile phone number characteristic, judging that the numeric number is a mobile phone number. When the key information is an 11-digit numeric number, and the first three digits of the numeric number have a fixed-line telephone number characteristic, it is to judge that the numeric number is a fixed-line telephone number. When the key information is an 18-digit numeric number, and the first six digits of the numeric number have an identity card address code characteristic, it is to judge that the numeric number is an identity card number.

Figure 2:
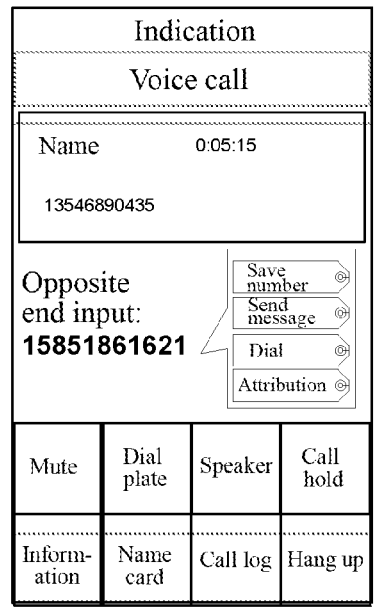
FIG. 2 is a schematic diagram of a mobile phone number operation menu of the receiving terminal in the method for processing information based on dual-tone multifrequency according to the embodiment of the present document.
Figure 3:
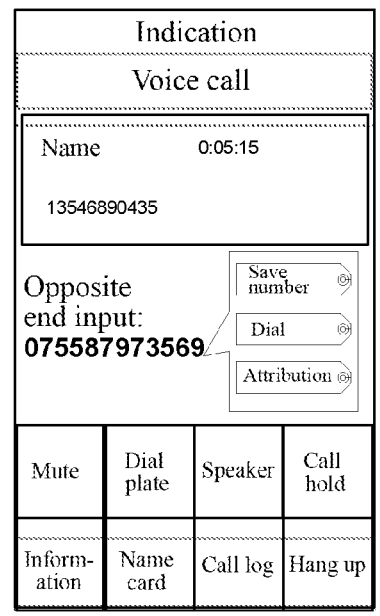
FIG. 3 is a schematic diagram of a fixed-line telephone number operation menu of the receiving terminal in the method for processing information based on dual-tone multifrequency according to the embodiment of the present document.
Figure 4:
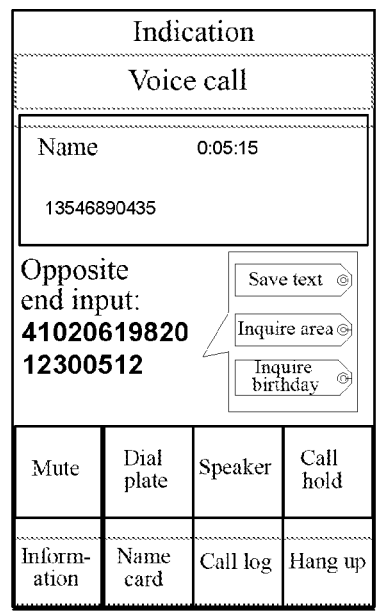
FIG. 4 is a schematic diagram of an identity card number operation menu of the receiving terminal in the method for processing information based on dual-tone multifrequency according to the embodiment of the present document.

The operation menus can include: a mobile phone number operation menu, a fixed-line telephone number operation menu and an identity card number operation menu. With reference to FIG. 2, the mobile phone number operation menu includes: a save-number menu item, a send-message menu item, a dial menu item, and a number attribution inquiry menu item. With reference to FIG. 3, the fixed-line telephone number operation menu includes: a save-number menu item, a dial menu item, and a number attribution inquiry menu item. With reference to FIG. 4, the identity card number operation menu includes: a save-text menu item, an identity card number attribution inquiry menu item, and an identity card holder birthday inquiry menu item.

Furthermore, in the above embodiment of the method for processing information based on dual-tone multifrequency, the key information judgment policy also includes: when the key information is the first non-numeric number, defining the first non-numeric number as a last-digit numeric number deletion instruction; when the key information is the second non-numeric number, defining the second non-numeric number as next-group numeric numbers input prompt information; and when the key information is the third non-numeric number, defining the third non-numeric number as clearing the last group of numeric numbers.

Furthermore, in the above embodiment of the method for processing information based on dual-tone multifrequency, when the key information is non-numeric numbers, the receiving terminal performing corresponding operations according to the key information is specifically: when the key information is the first non-numeric number, the receiving terminal determining that the key information is the last-digit numeric number deletion instruction, and executing an operation of deleting the last-digit numeric number. When the key information is the second non-numeric number, the receiving terminal determines that the key information is the next-group numeric numbers input prompt information, and executes an operation of receiving and processing the next group of numeric numbers sent by the sending terminal. When the key information is the third non-numeric number, the receiving terminal determines that the key information is a last-group numeric numbers deletion instruction, and executes an operation of clearing the last group of numeric numbers. The first non-numeric number, the second non-numeric number and the third non-numeric number are different non-numeric numbers respectively.

In the embodiment of the method for processing information based on dual-tone multifrequency according to the present document, in a process of the sending terminal establishing a voice call with the receiving terminal, the sending terminal encodes the received input key information into dual-tone multifrequency information and then transmits the dual-tone multifrequency information and voice call audio information to the receiving terminal together, and the receiving terminal then decodes and restores the dual-tone multifrequency information to the form of key information, thus two parties of the terminals establishing the voice call can mutually transmit the key information, compared to the existing verbal information transmission, it is simple to operate, an accuracy rate is high, and a case of information receiving errors will not occur; and compared to the existing information transmission by means of short messages, it is simple to operate, no short message fee will be produced, and expense costs are lower.

Figure 5:
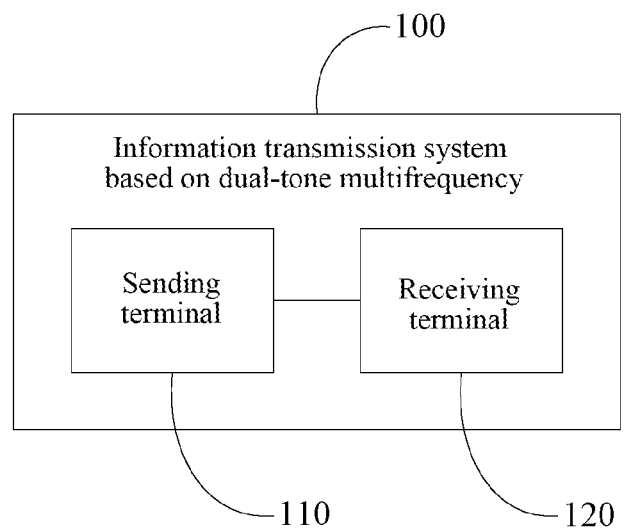
FIG. 5 is a schematic diagram of a structure of a system for processing information based on dual-tone multifrequency according to one embodiment of the present document.

With reference to FIG. 5, a system 100 for processing information based on dual-tone multifrequency is also disclosed in one embodiment of the present document, the system includes: a sending terminal 110 and a receiving terminal 120. The sending terminal 110 is configured to: receive input key information after establishing a voice call with the receiving terminal, encode the key information into dual-tone multifrequency information, and transmit the dual-tone multifrequency information and voice call audio information to the receiving terminal 120 together. The receiving terminal 120 is configured to: receive the dual-tone multifrequency information, and decode and restore the dual-tone multifrequency information to the key information; determine a type of the key information according to a preset key information judgment policy, and perform corresponding operations according to the key information.

Furthermore, in the above embodiment of the system 100 for processing information based on dual-tone multifrequency, the key information includes numeric numbers and non-numeric numbers. The receiving terminal 120 is configured to: when the key information is numeric numbers, generate corresponding operation menus according to characteristics of the numeric numbers, and perform corresponding operations on the operation menus according to a received menu operation instruction.

In the embodiment, the operation menus include multiple menu items. After generating a corresponding operation menu, the receiving terminal also displays the operation menu through a display module, a receiving terminal subscriber can select to input a menu item operation instruction according to menu items in the operation menu, and the receiving terminal executes a corresponding operation according to the input menu item operation instruction. Wherein the subscriber selecting to input the menu item operation instruction can be implemented by clicking an area in which a certain menu item in the operation menu is located. For example, a certain menu item is a save-number menu item, after the subscriber clicks an area in which the save-number menu item is located, the receiving terminal performs corresponding number save operation.

Furthermore, in the above embodiment of the system 100 for processing information based on dual-tone multifrequency, the key information includes numeric numbers and non-numeric numbers, wherein the numeric numbers can include: a mobile phone number, a fixed-line telephone number, an identity card number and a bank card number. After the sending terminal establishes the voice call with the receiving terminal, when a sending terminal subscriber wishes to transmit numeric number information (e.g. a mobile phone number) to the receiving terminal, the subscriber can input numeric numbers to the sending terminal through keys on a keyboard of the sending terminal, and then the sending terminal encodes each input numeric number into dual-tone multifrequency information that one signal with higher frequency and one signal with lower frequency are overlapped in a time domain according to a preset policy, with reference to Table 1. Then the encoded dual-tone multifrequency information is arranged according to a sequence corresponding to the input numeric numbers, and then the encoded dual-tone multifrequency information and voice call audio information are transmitted to the receiving terminal together.

Furthermore, in the above embodiment of the system 100 for processing information based on dual-tone multifrequency, the operation menus include: a mobile phone number operation menu, a fixed-line telephone number operation menu and an identity card number operation menu. The mobile phone number operation menu includes: a save-number menu item, a send-message menu item, a dial menu item, and a number attribution inquiry menu item. The fixed-line telephone number operation menu includes: a save-number menu item, a dial menu item, and a number attribution inquiry menu item. The identity card number operation menu includes: a save-text menu item, an identity card number attribution inquiry menu item, and an identity card holder birthday inquiry menu item.

Furthermore, in the above embodiment of the system 100 for processing information based on dual-tone multifrequency, the key information judgment policy includes: when the key information is an 11-digit numeric number, and the first three digits of the numeric number have a mobile phone number characteristic, judging that the numeric number is a mobile phone number. When the key information is an 11-digit numeric number, and the first three digits of the numeric number have a fixed-line telephone number characteristic, it is to judge that the numeric number is a fixed-line telephone number. When the key information is an 18-digit numeric number, and the first six digits of the numeric number have an identity card address code characteristic, it is to judge that the numeric number is an identity card number.

Furthermore, in the above embodiment of the method for processing information based on dual-tone multifrequency, the key information judgment policy also includes: when the key information is the first non-numeric number, defining the first non-numeric number as a last-digit numeric number deletion instruction; when the key information is the second non-numeric number, defining the second non-numeric number as next-group numeric numbers input prompt information; and when the key information is the third non-numeric number, defining the third non-numeric number as clearing the last group of numeric numbers.

Furthermore, in the above embodiment of the system 100 for processing information based on dual-tone multifrequency, the receiving terminal 120 is configured to: when the key information is the first non-numeric number, determine that the key information is the last-digit numeric number deletion instruction, and execute an operation of deleting the last-digit numeric number; when the key information is the second non-numeric number, determine that the key information is the next-group numeric numbers input prompt information, and execute an operation of receiving and processing the next group of numeric numbers sent by the sending terminal; and when the key information is the third non-numeric number, determine that the key information is a last-group numeric numbers deletion instruction, and execute an operation of clearing the last group of numeric numbers. The first non-numeric number, the second non-numeric number and the third non-numeric number are different non-numeric numbers respectively.

In the system 100 for processing information based on dual-tone multifrequency according to the embodiment of the present document, in a process of the sending terminal 110 establishing a voice call with the receiving terminal 120, the sending terminal 110 encodes the received input key information into dual-tone multifrequency information and then transmits the dual-tone multifrequency information and voice call audio information to the receiving terminal 120 together, and the receiving terminal 120 then decodes and restores the dual-tone multifrequency information to the form of key information, thus two parties of the terminals establishing the voice call can mutually transmit the key information, compared to the existing verbal information transmission, it is simple to operate, an accuracy rate is high, and a case of information receiving errors will not occur; and compared to the existing information transmission by means of short messages, it is simple to operate, no short message fee will be produced, and expense costs are lower.

A receiving terminal is also disclosed in the embodiment of the present document, the receiving terminal in the embodiment is the above receiving terminal 120 in the system 100 for processing information based on dual-tone multifrequency, which will not be repeated here.

Figure 6:
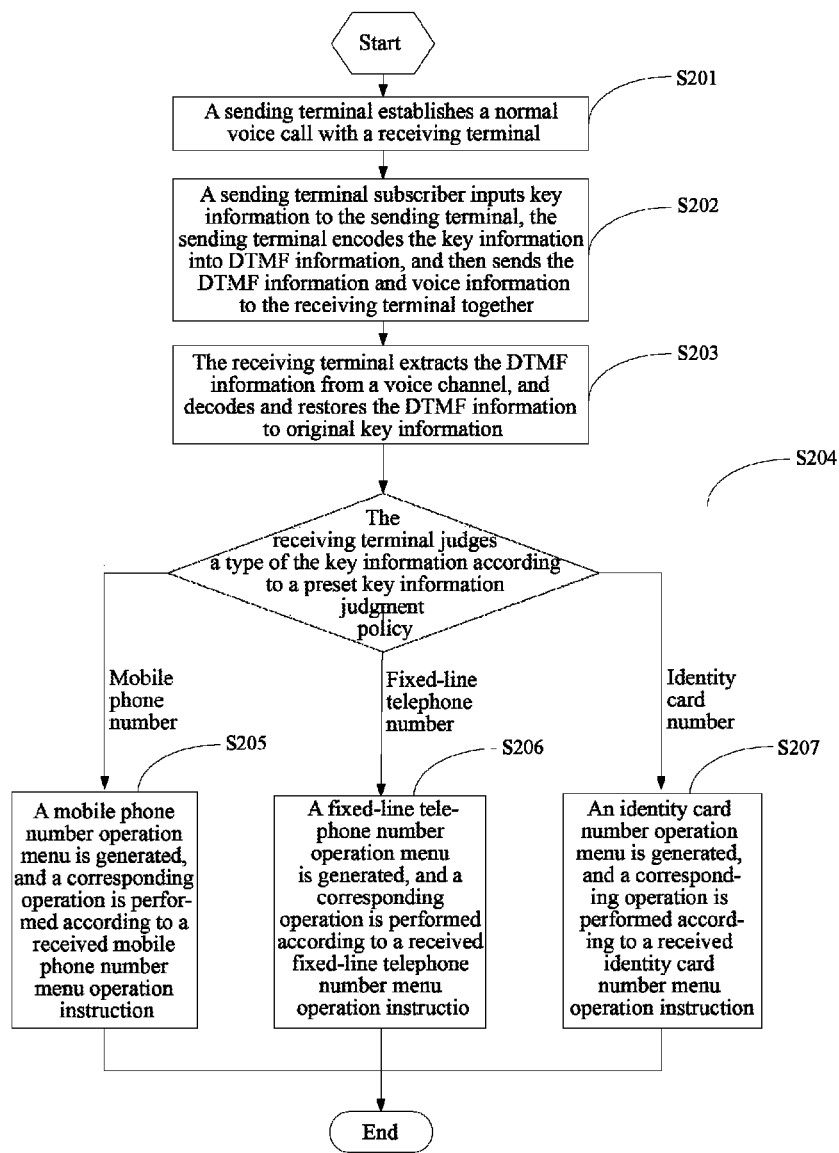
FIG. 6 is a flow chart of a method for processing information based on dual-tone multifrequency according to the specific example of the present document.

The method for processing information based on dual-tone multifrequency according to the present document will be described in detail through a specific example. With reference to FIG. 6, FIG. 6 is a flow chart of the method for processing information based on dual-tone multifrequency according to the specific example of the present document. A flow of the specific example includes the following steps.

In step S201, a sending terminal establishes a normal voice call with a receiving terminal.

In step S202, a sending terminal subscriber inputs key information to the sending terminal, the sending terminal encodes the key information into DTMF information, and then sends the DTMF information and voice information to the receiving terminal together.

In step S203, the receiving terminal extracts the DTMF information from a voice channel, and decodes and restores the DTMF information to original key information.

In step S204, the receiving terminal judges the type of the key information according to a preset key information judgment policy.

Specifically, it is to firstly judge whether the key information is a mobile phone number, that is, it is to firstly judge whether the key information conforms to a mobile phone number characteristic; if the key information is a mobile phone number, it proceeds to step S205; if the key information is not a mobile phone number, it is to judge whether the key information is a fixed-line telephone number, that is, it is to judge whether the key information conforms to a fixed-line telephone number characteristic; if the key information is a fixed-line telephone number, it proceeds to step S206; if the key information is not a fixed-line telephone number, it is to judge whether the key information is an identity card number, that is, it is to judge whether the key information conforms to an identity card number characteristic, if the key information is an identity card number, it proceeds to step S207; and if the key information is not an identity card number, the flow ends.

In step S205, the receiving terminal generates a mobile phone number operation menu, and performs a corresponding operation according to a received mobile phone number menu operation instruction.

Here, the mobile phone number operation menu is displayed through the display module, wherein the operation menu includes a save-number menu item, a send-message menu item, a dial menu item and a number attribution inquiry menu item. At this point, the subscriber can select to input a corresponding menu operation instruction such as a save-number operation instruction to the receiving terminal by contrast to menu items in the operation menu according to his/her own will, and the receiving terminal executes a corresponding number save operation after receiving the save-number operation instruction.

In step S206, the receiving terminal generates a fixed-line telephone number operation menu, and performs a corresponding operation according to a received fixed-line telephone number menu operation instruction.

Here, the fixed-line telephone number operation menu is displayed through the display module, wherein the fixed-line telephone number operation menu includes a save-number menu item, a dial menu item and a number attribution inquiry menu item. At this point, the subscriber can select to input a corresponding menu operation instruction such as a number attribution inquiry operation instruction to the receiving terminal by contrast to menu items in the operation menu according to his/her own will, and the receiving terminal executes a corresponding number attribution inquiry operation after receiving the number attribution inquiry operation instruction.

In step S207, the receiving terminal generates an identity card number operation menu, and performs a corresponding operation according to a received identity card number menu operation instruction.

Here, the identity card number operation menu is displayed through the display module, wherein the identity card number operation menu includes a save-text menu item, an identity card number attribution inquiry menu item, and an identity card holder birthday inquiry menu item. At this point, the subscriber can select to input a corresponding menu operation instruction such as an identity card holder birthday inquiry operation instruction to the receiving terminal by contrast to menu items in the operation menu according to his/her own will, and the receiving terminal executes a corresponding identity card holder birthday inquiry operation after receiving the identity card holder birthday inquiry operation instruction.

The key information in the embodiment of the present document includes but is not limited to the above mobile phone number, fixed-line telephone number and identity card number, for example, the key information can also include a bank card number and a QQ chat number and so on.

Figure 7:
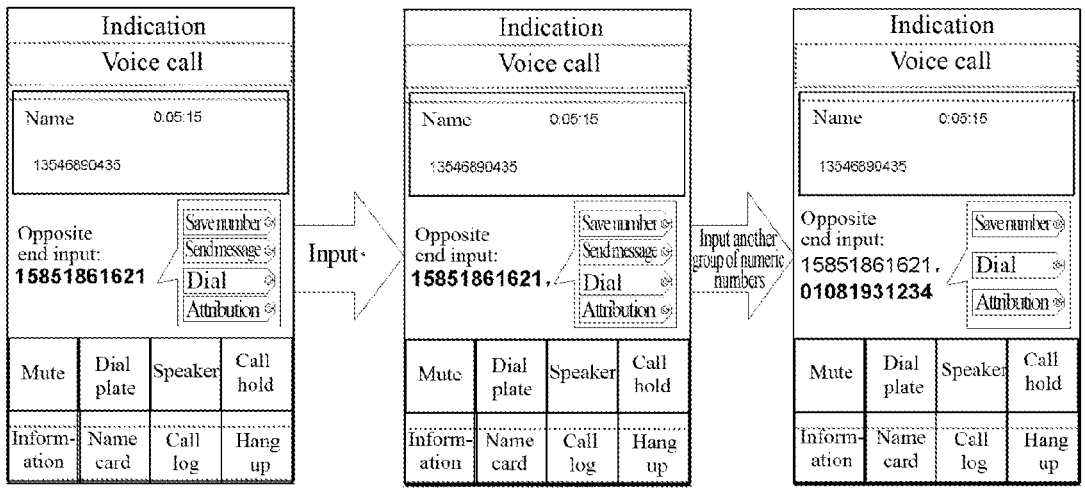
FIG. 7 is a schematic diagram of receiving multiple groups of numeric numbers in the receiving terminal in the system for processing information based on dual-tone multifrequency according to the embodiment of the present document.

Moreover, in the embodiment of the present document, the sending terminal can send multiple numeric numbers of the same type or multiple numeric numbers of different types to the receiving terminal. Wherein multiple groups of numeric numbers are differentiated by other nonnumeric numbers, for example, differentiation between multiple groups of numeric numbers can be implemented through *, similarly, the nonnumeric numbers used for differentiating the multiple groups of numeric numbers are also encoded into dual-tone multifrequency information according to a preset policy, and the dual-tone multifrequency information and voice call frequency information are transmitted to a receiving module. After receiving the dual-tone multifrequency information, the receiving module decodes and restores the dual-tone multifrequency information to original nonnumeric numbers, and it can be decoded into a comma according to the preset policy. With reference to FIG. 7, in a voice call between the sending terminal and the receiving terminal, the sending terminal sends an encoded mobile phone number to the receiving terminal, the receiving terminal judges and determines that it is a mobile phone number after decoding and restoring the encoded mobile phone number, generates a corresponding mobile phone number operation menu and displays the mobile phone number operation menu through the display module. Wherein, the mobile phone number operation menu includes a save-number menu item, a send-message menu item, a dial menu item and a number attribution inquiry menu item. After sending an encoded mobile phone number to the receiving terminal, the sending terminal wishes to send another numeric number to the receiving terminal, at this point, the sending terminal informs the receiving terminal of sending of the next group of numeric numbers by sending an encoded second non-numeric number (e.g. *) to the receiving terminal, the receiving terminal then decodes and restores the encoded second non-numeric number into an original non-numeric number, or decodes the encoded second non-numeric number into a comma or a semicolon according to the preset policy. The sending terminal sends a group of encoded mobile phone number and non-numeric number to the receiving terminal, and then sends a group of encoded fixed-line telephone number. The receiving terminal orderly decodes and restores the encoded mobile phone number, non-numeric number and encoded fixed-line telephone number to an original mobile phone number, non-numeric number and fixed-line telephone number. Since there are multiple groups of numeric numbers, the receiving terminal generates operation menus corresponding to the numeric numbers according to a type of each group of numeric numbers, but a display area of the display module is limited, thus the receiving terminal can display an operation menu of a corresponding numeric number according to an instruction input by the subscriber. For example, if the subscriber needs to perform corresponding operation on the mobile phone number, it is only required to click a display area of the mobile phone number, and an operation menu of the mobile phone number can be displayed. However, before the subscriber inputs an instruction, the receiving terminal can default display an operation menu of the last group of numeric numbers.

Figure 8:
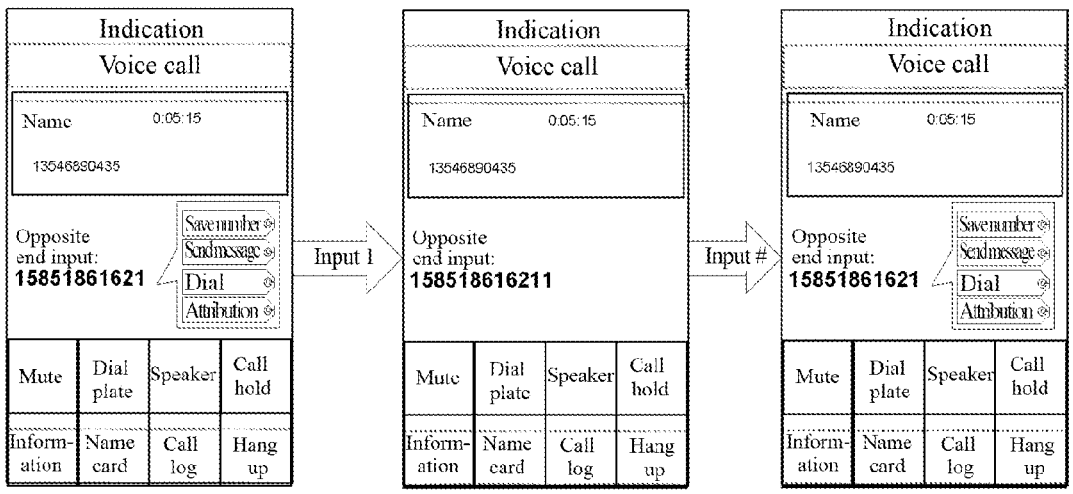
FIG. 8 is a schematic diagram of deleting the last-digit numeric number in the receiving terminal in the system for processing information based on dual-tone multifrequency according to the embodiment of the present document.

Since the numeric number sent by the sending terminal after the sending terminal establishes the voice call with the receiving terminal to the receiving terminal may be inconsistent with a numeric number required to be sent actually, with reference to FIG. 8, a numeric number sent by the sending terminal has one more digit than an actually required numeric number, it causes that the receiving terminal cannot determine a category of the numeric number. At this point, the sending terminal is required to send an instruction to notify the receiving terminal to delete the last digit in the numeric number. The sending terminal can notify the receiving terminal to delete the last digit in the numeric number by sending the first non-numeric number, for example, by sending an encoded non-numeric number #, the receiving terminal receives the encoded #, decodes and restores the encoded # to an original non-numeric number #, then deletes the last digit in the decoded numeric number, and then judges a type of the numeric number. It is determined that the numeric number is a mobile phone number at this point, and then a mobile phone number operation menu is generated and displayed.

In addition, after the sending terminal establishes the voice call with the receiving terminal in the embodiment of the present document, the numeric number sent by the sending terminal to the receiving terminal may be wrong, for example, the sent numeric number is other's mobile phone number, but it is carelessly and mistakenly sent to the receiving terminal, and a sending terminal subscriber does not wish a receiving terminal subscriber to perform relevant operation on the mobile phone number. At this point, the sending terminal should send an instruction to the receiving terminal, and notify the receiving terminal to clear the mobile phone number. The sending terminal can send an encoded third non-numeric number serving as a clear instruction to the receiving terminal, and the receiving terminal restores the encoded non-numeric number to an original non-numeric number after receiving the encoded non-numeric number, and then clears the mobile phone number. Wherein, the non-numeric number can be # and *, or a punctuation, or a capital or lowercase English letter. Certainly, if certain non-numeric numbers have been defined as other functionality instructions, in order to avoid confusion, it avoids defining the certain non-numeric numbers as clear instructions for the numeric numbers. For example, if the non-numeric number # is defined as a deletion instruction for the last numeric number in a group of numeric numbers, and the non-numeric number * is defined as a decollator between multiple groups of numeric numbers, the non-numeric numbers # and * cannot be defined as clear instructions for the numeric numbers.

Moreover, in the process of the sending terminal establishing the voice call with the receiving terminal, the sending terminal sends the encoded key information to the receiving terminal, after the receiving terminal receives the encoded key information, the voice call is hung off, the receiving terminal still performs the follow-up corresponding operation, and the encoded key information sent from the sending terminal will not be lost.

It should be understood that, the above description is only the preferred embodiments of the present document, which cannot limit the patent scope of the present document due to this. Equivalent structures or equivalent flow transformations made by using the contents of descriptions and accompanying drawings of the present document, or equivalent structures or equivalent flow transformations directly or indirectly applied in other related technical fields, are all included in the patent protection scope of the present document similarly.

INDUSTRIAL APPLICABILITY

With a method and system for processing information based on dual-tone multifrequency, and a receiving terminal provided in the present document, in a process of a sending terminal establishing a voice call with the receiving terminal, the sending terminal encodes the received input key information into dual-tone multifrequency information and then transmits the dual-tone multifrequency information and voice call audio information to the receiving terminal together, and the receiving terminal then decodes and restores the dual-tone multifrequency information to the form of key information, thus two parties of the terminals establishing the voice call can mutually transmit the key information, compared to the existing verbal information transmission, it is simple to operate, an accuracy rate is high, and a case of information receiving errors will not occur; and compared to the existing information transmission by means of short messages, it is simple to operate, no short message fee will be produced, and expense costs are lower.

What is claimed is:

1. A method for processing information based on dual-tone multifrequency, comprising:
   a sending terminal establishing a voice call with a receiving terminal;
   the sending terminal receiving input key information, encoding the key information into dual-tone multifrequency information, and transmitting the dual-tone multifrequency information and voice call audio information to the receiving terminal together; and the receiving terminal decoding and restoring the dual-tone multifrequency information to the key information; determining a type of the key information according to a preset key information judgment policy, and performing corresponding operations according to the key information;

wherein, the key information judgment policy comprises:

when the key information is an 11-digit numeric number, and first three digits of the numeric number have a mobile phone number characteristic, judging that the numeric number is a mobile phone number;

when the key information is an 11-digit numeric number, and first three digits or first four digits of the numeric number have a fixed-line telephone number characteristic, judging that the numeric number is a fixed-line telephone number;

when the key information is an 18-digit numeric number, and first six digits of the numeric number have an identity card address code characteristic, judging that the numeric number is an identity card number.

2. The method for processing information based on dual-tone multifrequency according to claim 1, wherein, when the key information is numeric numbers, performing corresponding operations according to the key information is specifically:

generating corresponding operation menus according to characteristics of the numeric numbers, and performing corresponding operations on the operation menus according to a received menu operation instruction.

3. The method for processing information based on dual-tone multifrequency according to claim 2, wherein, the numeric numbers comprise: a mobile phone number, a fixed-line telephone number, an identity card number and a bank card number;

the operation menus comprise: a mobile phone number operation menu, a fixed-line telephone number operation menu, an identity card number operation menu and a bank card number operation menu.

4. The method for processing information based on dual-tone multifrequency according to claim 3, wherein, the key information judgment policy further comprises:

when the key information is a first non-numeric number, defining the first non-numeric number as a last-digit numeric number deletion instruction; when the key information is a second non-numeric number, defining the second non-numeric number as next-group numeric numbers input prompt information; and when the key information is a third non-numeric number, defining the third non-numeric number as clearing a last group of numeric numbers.

5. The method for processing information based on dual-tone multifrequency according to claim 4, wherein, when the key information is non-numeric numbers, the receiving terminal performing corresponding operations according to the key information is specifically:

when the key information is the first non-numeric number, the receiving terminal determining that the key information is the last-digit numeric number deletion instruction, and executing an operation of deleting the last-digit numeric number;

when the key information is the second non-numeric number, the receiving terminal determining that the key information is the next-group numeric numbers input prompt information, and executing an operation of receiving and processing the next group of numeric numbers sent by the sending terminal; and when the key information is the third non-numeric number, the receiving terminal determining that the key information is a last-group numeric numbers deletion instruction, and executing an operation of clearing the last group of numeric numbers;

wherein, the first non-numeric number, the second non-numeric number and the third non-numeric number are different non-numeric numbers respectively.

6. The method for processing information based on dual-tone multifrequency according to claim 1, wherein, the mobile phone number operation menu comprises: a save-number menu item, a send-message menu item, a dial menu item, and a number attribution inquiry menu item;

the fixed-line telephone number operation menu comprises: a save-number menu item, a dial menu item, and a number attribution inquiry menu item; and the identity card number operation menu comprises: a save-text menu item, an identity card number attribution inquiry menu item, and an identity card holder birthday inquiry menu item.

7. A system for processing information based on dual-tone multifrequency, comprising:

a sending terminal, configured to: receive input key information after establishing a voice call with a receiving terminal, encode the key information into dual-tone multifrequency information, and transmit the dual-tone multifrequency information and voice call audio information to the receiving terminal together; and the receiving terminal, configured to: receive the dual-tone multifrequency information, and decode and restore the dual-tone multifrequency information to the key information; determine a type of the key information according to a preset key information judgment policy, and perform corresponding operations according to the key information;

wherein the key information judgment policy comprises:

when the key information is an 11-digit numeric number, and first three digits of the numeric number have a mobile phone number characteristic, judging that the numeric number is a mobile phone number;

when the key information is an 11-digit numeric number, and first three digits or first four digits of the numeric number have a fixed-line telephone number characteristic, judging that the numeric number is a fixed-line telephone number;

when the key information is an 18-digit numeric number, and first six digits of the numeric number have an identity card address code characteristic, judging that the numeric number is an identity card number.

8. The system for processing information based on dual-tone multifrequency according to claim 7, wherein, the key information comprises numeric numbers and non-numeric numbers;

the receiving terminal is configured to: when the key information is numeric numbers, generate corresponding operation menus according to characteristics of the numeric numbers, and perform corresponding operations on the operation menus according to a received menu operation instruction.

9. The system for processing information based on dual-tone multifrequency according to claim 8, wherein, the numeric numbers comprise: a mobile phone number, a fixed-line telephone number, an identity card number and a bank card number;

the operation menus comprise: a mobile phone number operation menu, a fixed-line telephone number operation menu, an identity card number operation menu and a bank card number operation menu.

10. The system for processing information based on dual-tone multifrequency according to claim 9, wherein, the key information judgment policy further comprises:
when the key information is a first non-numeric number, defining the first non-numeric number as a last-digit numeric number deletion instruction; when the key information is a second non-numeric number, defining the second non-numeric number as next-group numeric numbers input prompt information; and when the key information is a third non-numeric number, defining the third non-numeric number as clearing a last group of numeric numbers.

11. The system for processing information based on dual-tone multifrequency according to claim 10, wherein, the receiving terminal is configured to: when the key information is the first non-numeric number, determine that the key information is the last-digit numeric number deletion instruction, and execute an operation of deleting the last-digit numeric number; when the key information is the second non-numeric number, determine that the key information is the next-group numeric numbers input prompt information, and execute an operation of receiving and processing the next group of numeric numbers sent by the sending terminal; and when the key information is the third non-numeric number, determine that the key information is a last-group numeric numbers deletion instruction, and execute an operation of clearing the last group of numeric numbers;
wherein, the first non-numeric number, the second non-numeric number and the third non-numeric number are different non-numeric numbers respectively.

12. The system for processing information based on dual-tone multifrequency according to claim 7, wherein,
the mobile phone number operation menu comprises: a save-number menu item, a send-message menu item, a dial menu item, and a number attribution inquiry menu item;
the fixed-line telephone number operation menu comprises: a save-number menu item, a dial menu item, and a number attribution inquiry menu item; and
the identity card number operation menu comprises: a save-text menu item, an identity card number attribution inquiry menu item, and an identity card holder birthday inquiry menu item.

13. A receiving terminal, configured to: receive dual-tone multifrequency information, and decode and restore the dual-tone multifrequency information to key information; determine a type of the key information according to a preset key information judgment policy, and perform corresponding operations according to the key information;
wherein the key information judgment policy comprises:
when the key information is an 11-digit numeric number, and first three digits of the numeric number have a mobile phone number characteristic, judging that the numeric number is a mobile phone number;
when the key information is an 11-digit numeric number, and first three digits or first four digits of the numeric number have a fixed-line telephone number characteristic, judging that the numeric number is a fixed-line telephone number;
when the key information is an 18-digit numeric number, and first six digits of the numeric number have an identity card address code characteristic, judging that the numeric number is an identity card number.

14. The receiving terminal according to claim 13, wherein, the key information includes numeric numbers and non-numeric numbers;
the receiving terminal is configured to: when the key information is numeric numbers, generate corresponding operation menus according to characteristics of the numeric numbers, and perform corresponding operations on the operation menus according to a received menu operation instruction.

15. The receiving terminal according to claim 14, wherein, the numeric numbers comprise: a mobile phone number, a fixed-line telephone number, an identity card number and a bank card number; the operation menus comprise: a mobile phone number operation menu, a fixed-line telephone number operation menu, an identity card number operation menu and a bank card number operation menu.

16. The receiving terminal according to claim 15, wherein, the key information judgment policy further comprises:
when the key information is a first non-numeric number, defining the first non-numeric number as a last-digit numeric number deletion instruction; when the key information is a second non-numeric number, defining the second non-numeric number as next-group numeric numbers input prompt information; and when the key information is a third non-numeric number, defining the third non-numeric number as clearing a last group of numeric numbers;
preferably, wherein, the receiving terminal is configured to: when the key information is the first non-numeric number, determine that the key information is the last-digit numeric number deletion instruction, and execute an operation of deleting the last-digit numeric number; when the key information is the second non-numeric number, determine that the key information is the next-group numeric numbers input prompt information, and execute an operation of receiving and processing the next group of numeric numbers sent by the sending terminal; and when the key information is the third non-numeric number, determine that the key information is a last-group numeric numbers deletion instruction, and execute an operation of clearing the last group of numeric numbers;
wherein, the first non-numeric number, the second non-numeric number and the third non-numeric number are different non-numeric numbers respectively.

17. The receiving terminal according to claim 15, wherein,
the mobile phone number operation menu comprises: a save-number menu item, a send-message menu item, a dial menu item, and a number attribution inquiry menu item;
the fixed-line telephone number operation menu comprises: a save-number menu item, a dial menu item, and a number attribution inquiry menu item; and
the identity card number operation menu comprises: a save-text menu item, an identity card number attribution inquiry menu item, and an identity card holder birthday inquiry menu item.

* * * * *